United States Patent [19]

Murakawa et al.

[11] 4,318,149

[45] Mar. 2, 1982

[54] RC COMPOSITE COMPONENT WITH SPARK GAP

[75] Inventors: Tetsuya Murakawa, Fukui; Toshimi Kaneko, Sabae, both of Japan

[73] Assignee: Murata Manufacturing Co., Ltd., Japan

[21] Appl. No.: 165,634

[22] Filed: Jul. 3, 1980

[30] Foreign Application Priority Data

Jul. 13, 1979 [JP] Japan ............................ 54-97375[U]

[51] Int. Cl.$^3$ ............................................... H02H 9/06

[52] U.S. Cl. ....................................... 361/15; 315/59; 338/262; 338/283; 361/56; 361/91

[58] Field of Search ..................... 361/15, 56, 91, 111, 361/112, 117; 338/262, 283, 277, 280, 334; 333/172; 315/59; 313/203, 205, 190

[56] References Cited

U.S. PATENT DOCUMENTS

| | | | |
|---|---|---|---|
| 2,634,330 | 4/1953 | Gaudio | 338/334 X |
| 3,087,093 | 4/1963 | Bourgerie | 361/15 |
| 3,654,511 | 4/1972 | Iwaya | 361/15 X |
| 4,064,477 | 12/1977 | Thompson | 338/283 X |

*Primary Examiner*—Harry E. Moose, Jr.
*Attorney, Agent, or Firm*—Ostrolenk, Faber, Gerb & Soffen

[57] ABSTRACT

An RC composite component with a spark gap comprises a pair of discharge electrodes defining the predetermined spark gap and formed on a dielectric substrate. The discharge electrodes are coated with a film of varnish with a controlled thickness by the screen process.

25 Claims, 9 Drawing Figures

RC COMPOSITE COMPONENT WITH SPARK GAP

BACKGROUND OF THE INVENTION

1. Field of the Invention

This invention relates to an RC composite component provided with a spark gap for protection against overvoltage and more particularly it relates to improvements for adjusting discharge start voltage to a predetermined range.

2. Description of the Prior Art

RC composite components having a spark gap are used in lightning protectors for bypassing circuits included in television receivers, video tape recorders, business transceivers and the like to provide protection against abnormally high voltages.

FIG. 1 is a front view showing an example of a conventional RC composite component having a spark gap. FIG. 2 is a rear view of the component of FIG. 1. FIG. 3 is a section taken along the line III—III of FIG. 2, showing the component of FIG. 1 in a resin-clothed state. FIG. 4 is a diagrammatic view of the electric circuit arrangement of the device of FIG. 1.

The RC composite component with a spark gap includes a dielectric substrate 1 formed of ceramic or the like. One surface of the dielectric substrate 1, as shown in FIG. 1, is provided with two capacitor electrodes 2, a film resistor 3 interconnecting said capacitor electrodes 2, and discharge electrodes 4 each integrally extending from the respective capacitor electrodes 2. A spark gap g is defined between the discharge electrodes 4. The spark gap dimension is indicated by "a". Each capacitor electrode 2 has a lead wire 5 connected thereto as by soldering. The other surface of the dielectric substrate 1, as shown in FIG. 2, is formed with a common capacitor electrode 6. The arrangement thus made provides two series-connected capacitors C1 and C2, and a resistor R and a spark gap g connected in parallel with said series-connected capacitors C1 and C2, as shown in FIG. 4. The component is resin-coated with a resin 7 such as of the phenol type, as shown in FIG. 3. This coating is performed such that the resin 7 is not applied to the entire area of one surface of the dielectric substrate 1 in order that the spark gap g defined between the discharge electrodes 4 is not covered with the resin 7.

In the arrangement described above, if an abnormally high voltage appears across the lead wires 5, a conductive path is formed across the spark gap g, through which a discharge occurs, thus reducing the peak value of the abnormally high voltage and preventing damage to the component. At the end of the discharge, the conductive path is blocked and the spark gap is again in an insulated state.

In such RC composite components, it will be understood that in order to raise the flashover voltage at which a discharge across the discharge electrodes 4 begins, the dimension "a" may be increased. However, as the dimension "a" increases, the size of the entire component also increases, thus failing to meet requirements for miniaturization of components. In this connection, if a flashover voltage of 3.0 kV AC or above is to be obtained, the dimension "a" must be at least 6 mm. Thus, the desire to raise the discharge start voltage runs counter to the desire to miniaturize components.

When RC composite components with a spark gap are used, e.g., on the antenna terminal board of a television receiver, the upper and lower limits of discharge voltage are prescribed by the UL standards. For example, there are requirements that the lower limit of flashover voltage be selected so that no discharge will occur at or below 3.5 kV AC and that the upper limit be selected such that satisfactory discharge will occur as determined by a 5.0 kV discharge test according to the UL standards. In order to meet these requirements, it is insufficient only to raise the flashover voltage and it is necessary to set such flashover voltage in a predetermined range.

It has heretofore been practiced to apply a wax to the spark gap region, though not primarily intended to raise the flashover voltage. The primary object of such application of wax is as follows.

Even after the component has been covered with the resin 7, as shown in FIG. 3, the spark gap g defined between the discharge electrodes 4 remains exposed to allow satisfactory discharge. In such condition, the spark gap g can be easily influenced by moisture and other external factors. It is known that the flashover voltage varies relatively widely under the influence of moisture and other external factors. It has been found advantageous to apply a wax to the spark gap g for the purpose of reducing such variation as much as possible. Such application of wax is performed e.g., by immersing the entire component in a wax after it has been covered with the resin 7, as shown in FIG. 3. Thus, at least the spark gap region is covered with the wax and the variation of flashover voltage due to moisture and other external factors can be reduced. In this connection, it has also been found, as a matter of fact related to the present invention, that the flashover voltage more or less rises. Such rise in flashover voltage, however, is no more than a "by-product" and is insufficient to meet the requirements described above while miniaturizing components. It is true that the thicker the film of wax, the higher the flashover voltage, but it is difficult to control the film thickness because immersion process is employed for application of such wax.

On the other hand, varnishes are sometimes used to provide increased withstand voltage values for capacitors in general. Application of varnishes to capacitors is performed by immersing the completed capacitor in the varnish and then baking the same. This increases the creeping distance between the capacitor electrodes, thus providing an increased withstand voltage value. Provision of increased withstand voltage values for capacitors has been described as an example of a technical field in which varnishes are used, but varnishes have not been used for the purpose of increasing the flashover voltage across the spark gap of RC composite components having such spark gap. The reason in brief is that the increase of withstand voltage values for capacitors is essentially different in object from the increase of flashover voltage. The higher a withstand voltage value for capacitors, the more highly it is evaluated, putting aside the results obtained. On the other hand, the evaluation of rises in flashover voltage across the spark gap of RC composite components having such spark gap is not of such a nature that the higher the value, the better. That is, it is necessary to set the flashover voltage in a predetermined range. If a film of varnish on the spark gap region (discharge electrodes) is so thick that the flashover voltage is higher than the desired value, predetermined discharge will not occur, sometimes even resulting in damage to the component.

Conversely, it is also undesirable that such film of varnish is so thin that a desired high discharge voltage cannot be obtained. For this reason, it is required that the thickness of a film of varnish formed on the spark gap (discharge electrodes) be controllable so as to set the flashover voltage in a predetermined range. However, the process of immersing RC composite components with a spark gap in a varnish tends to produce variation in the thickness of the varnish film and cannot be said to be a desirable process. Thus, the varnish immersion process heretofore employed in general capacitors cannot be readily employed in RC composite components with a spark gap because the intended object of the process differs.

Further, if said varnish immersion process is applied to RC composite components having a spark gap, the following drawbacks will result: First, since the varnish adhering also to the film resistor 3 has adverse influences on the electrical characteristics of the resistor. Secondly, if immersion in varnish is followed by coating with the resin 7, the force with which the resin 7 adheres to the substrate 1 is reduced so much that the resin coating may be damaged by voltage. This is because the reduced adhesion of the resin 7 shortens the creeping distance between the capacitor electrodes 2. Thirdly, the varnish adheres also to the lead wires 5 and contaminates the latter, thus detracting from solderbility.

SUMMARY OF THE INVENTION

According to the present invention, it is possible to increase the flashover voltage without increasing the spark gap dimension to more than, e.g., 6 mm, preferably more than 4 mm and control said flashover voltage to set the latter in a particular range defined between upper and lower limits.

In brief, the present invention provides an RC composite component having capacitors, a resistor and a spark gap, said component including a dielectric substrate, a pair of discharge electrodes, and film forming means for adjusting the discharge start voltage to a predetermined range. The pair of discharge electrodes are formed on the dielectric substrate and the film forming means is provided in such a manner as to cover the discharge electrodes. The film forming means includes a varnish and is formed to cover a particular region including the discharge electrodes.

In a preferred embodiment of the invention, the film forming means adjusts the flashover voltage to a predetermined range in that the film thickness is controlled. The formation of said film forming means may be performed by the screen process, spraying or brushing. With these methods, it is easy to control the varnish film thickness. By controlling the varnish film thickness, flashover voltage can be selected such that no discharge will occur at 3.5 kV AC or below but that satisfactory discharge will occur as determined by a 5.0 kV discharge test according to the UL standards. The applicable varnishes include thermosetting resins and thermoplastic resins. Among the thermosetting resins available are phenol resins, silicone resins and epoxy resins. As for the thermoplastic resins, use is made of polyvinyl chloride, polyethylene and the like. A preferable structural embodiment of an RC composite component with a spark gap according to the invention comprises first and second capacitor electrodes formed on one surface of a dielectric substrate and a third common capacitor electrode formed on the other surface of said dielectric substrate. A pair of discharge electrodes are formed which integrally extend from the first and second capacitor electrodes, respectively. One integral electrode composed of the first capacitor electrode and one discharge electrode and the other integral electrode composed of the second capacitor electrode and the other discharge electrode have portions closest to each other defined by their respective discharge electrode portions. Further, such portions are clothed with an insulating resin. The coating resin covers the dielectric substrate in such a manner as to leave at least the pair of discharge electrodes exposed.

Accordingly, a principal object of the invention is to provide an RC composite component with a spark gap wherein the flashover voltage can be increased without increasing the spark gap dimension.

Another object of the invention is to provide an RC composite component with a spark gap wherein the flashover voltage can be easily adjusted to be set in a particular range.

A further object of the invention is to provide an RC composite component with a spark gap wherein the component can be easily miniaturized while maintaining predetermined discharge start voltage.

Another object of the invention is to provide a material used for increasing the discharge start voltage and allowing easy control of the film thickness.

These and other objects and features of the invention will become more apparent from the following detailed description given with reference to the accompanying drawings.

DETAILED DESCRIPTION OF THE PREFERRED EMBODIMENTS

Figure 1:
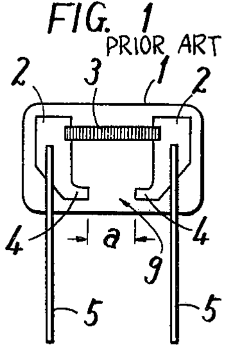
FIG. 1 PRIOR ART
FIG. 1 is a front view showing an example of a conventional RC composite component with a spark gap.
Figure 5:
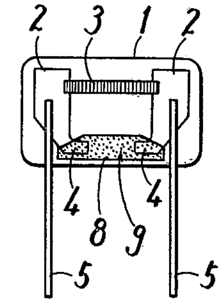
FIG. 5 is a front view showing an embodiment of the present invention.

Referring to FIG. 5, an embodiment of the present invention is shown and the parts corresponding to those of the conventional component shown in FIG. 1 are indicated by the same reference numerals. Therefore, a repetitious description of the corresponding parts will be omitted and only the characteristic arrangement of this embodiment will be described. To describe the arrangement of the embodiment shown in FIG. 5 in the order in which it is produced, first, as in the conventional case, an intermediate product shown in FIG. 1 is obtained. Next, a pattern (not shown) for screen processing is prepared. Further, a varnish having a controlled viscosity (which is provided as by addition of a filler) is prepared. The pattern for screen processing is disposed over a particular region including the discharge electrodes 4. With the pattern used, when said varnish is applied to the dielectric substrate 1, a varnish film 8 is formed on the particular region, as shown in FIG. 5. Although the shape and positioning of the pattern are not illustrated, they will be apparent from the manner in which the varnish film 8 is formed.

As for the varnish, use is made of a thermosetting resin dissolved in a suitable solvent. Among the thermosetting resins advantageous for this purpose are phenol resins, silicone resins and epoxy resins. When a varnish containing such thermosetting resin is used, preferably baking is performed for setting purposes after the varnish has been applied by the screen process.

It is also possible to use, as such varnish, a thermoplastic resin dissolved in a solvent. Such thermoplastic resins include polyvinyl chloride and polyethylene. In the case of using such thermoplastic resin, preferably heating just enough to evaporate the solvent is performed for fixing the varnish film.

With such formation of varnish films by the screen process described above, it is possible to control the film thickness so that there is no variation in the latter. The thicker the varnish film, the higher the flashover voltage across the pair of discharge electrodes 4. If, therefore, the varnish film thickness can be easily controlled as described above, it is possible not only to increase the flashover voltage but also to set the voltage in a predetermined range with ease. The previously described condition, which is an example of the UL standards, that no discharge should occur at 3.5 kV AC or below but that satisfactory discharge should occur as determined by a 5.0 kV discharge test according to the UL standards, can be easily satisfied. The thickness of the varnish film obtained by the invention may be controlled to have a desired value in the range from several microns to hundreds of microns. The invention is intended to provide particularly a miniaturized RC composite component with a spark gap and the spark gap dimension can be less than 6 mm, preferably less than 4 mm while providing a high discharge start voltage.

The means for forming varnish films includes, besides said screen process, spraying and brushing. In the case of spraying, a varnish can be applied to a particular region by using an unillustrated suitable mask. In the case of brushing, a varnish can be applied to a particular region by controlling the movement of the brush, but if a mask is used as in spraying, the application of a varnish to a particular region can be performed more efficiently.

Figure 6:
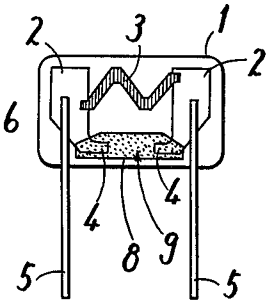
FIG. 6 is a front view showing another embodiment of the present invention.

Referring to FIG. 6, there is shown a component having a film resistor 3 which is a modification of that shown in FIG. 5. The film resistor 3 shown therein is formed zigzag. This form gives the film resistor 3 a higher resistance when using a resistor material having the same resistivity. Therefore, when it is desired to obtain the same resistance as before, it is possible to use a resistor material having a lower resistivity, thus giving a wider range of selection of materials for resistors. Further, such zigzag film resistor 3 is effective to prevent discharge which would otherwise occur within the insulating coating 7 along the film 3.

Figure 3:
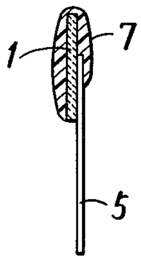
FIG. 3 PRIOR ART
FIG. 3 is a section taken along the line III—III of FIG. 2, showing the component of FIG. 1 in a resin-coated state.
Figure 4:
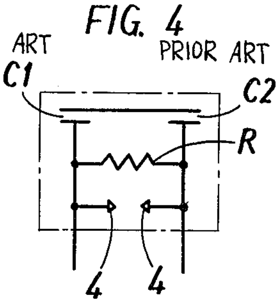
FIG. 4 PRIOR ART
FIG. 4 is a diagrammatic view of the electric circuit arrangement of the device of FIG. 1.
Figure 7:
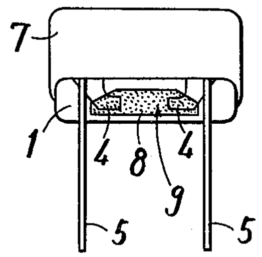
FIG. 7 is a front view showing the component of FIG. 5 or 6 in a resin-coated state.

Referring to FIG. 7, the component is shown coated with the resin 7 in the same manner as that shown in FIG. 3. The resin 7 is an insulating resin, e.g., of the phenol type. The resin 7 is applied to the dielectric substrate 1 in such a manner as to leave exposed the varnish film 8 formed at the spark gap g defined between the pair of discharge electrodes 4.

Figure 8:
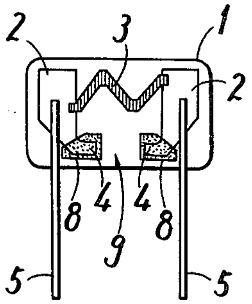
FIG. 8 is a front view of still another embodiment of the present invention.

Referring to FIG. 8, separate varnish films 8 are formed on the discharge electrodes 4, as contrasted with the single varnish film shown in FIG. 6. It has been found that such separate varnish films also provide substantially the same effect as in FIG. 5 or 6.

Figure 2:
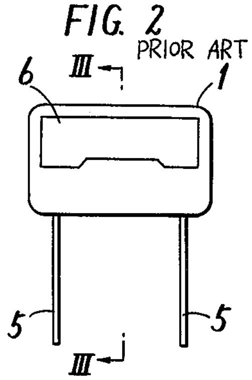
FIG. 2 PRIOR ART
FIG. 2 is a rear view of the component of FIG. 1.

In the embodiments shown in FIGS. 5, 6 and 8, their respective rear views are omitted, but a common capacitor electrode 6 is formed in each case, as in FIG. 2.

Figure 9:
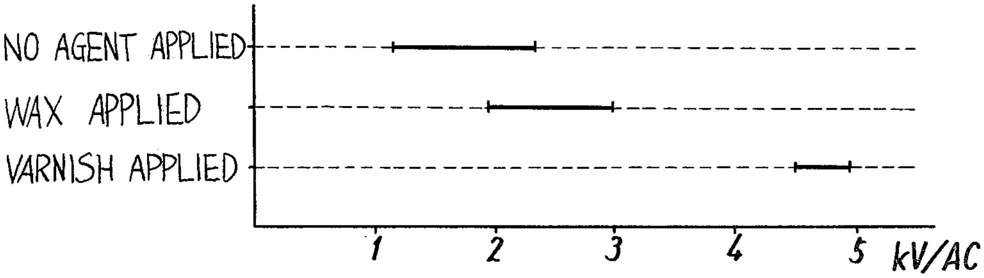
FIG. 9 is a graph indicating effects of the present invention in comparison with prior art components, wherein discharge start voltages for the same spark gap are shown.

FIG. 9 is a bar graph showing flashover voltage ranges in the case where the spark gap dimension a (FIG. 1) is 4 mm. FIG. 9 shows, from top to bottom, such cases as "no agent applied", "wax applied" and "varnish applied by screen process". As can be seen in FIG. 9, the case "wax applied" provides a slightly higher flashover voltage than the case "no agent applied", but the case "varnish applied" provides a much higher flashover voltage. Besides that, variation in flashover voltage, which are represented by the length of the bar, are much smaller in the case "varnish applied" than in the other two cases. This may be said to meet the characteristic requirements for flashover voltage defined by upper and lower limits described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An RC composite component with a spark gap having a capacitor and a resistor, comprising:
- a dielectric substrate,
- a pair of discharge electrodes formed on said dielectric substrate to define said spark gap therebetween, which has a predetermined spacing, and
- film forming means including a varnish for adjusting the flashover voltage to a predetermined range, said means being formed on said dielectric substrate to cover a particular region including said discharge electrodes.

2. An RC composite component with a spark gap as set forth in claim 1, wherein said film forming means is a single film which commonly covers said two discharge electrodes.

3. An RC composite component with a spark gap as set forth in claim 1, wherein said film forming means is two separate films which individually cover said respective discharge electrodes.

4. An RC composite component with a spark gap as set forth in claim 1, wherein said film forming means has a controlled film thickness to thereby adjust the flashover voltage to a predetermined range.

5. An RC composite component with a spark gap as set forth in claim 4, wherein said film forming means having said controlled film thickness is formed by the screen process.

6. An RC composite component with a spark gap as set forth in claim 4, wherein said film forming means having said controlled film thickness is formed by spraying.

7. An RC composite component with a spark gap as set forth in claim 4, wherein said film forming means having said controlled film thickness is formed by brushing.

8. An RC composite component with a spark gap as set forth in claim 4, wherein said predetermined range of flashover voltage is selected such that no discharge will occur at 3.5 kV AC or below but that satisfactory discharge will occur as determined by a 5.0 kV discharge test according to the UL standards.

9. An RC composite component wih a spark gap as set forth in claim 4, wherein said controlled film thickness is from several microns to hundreds of microns.

10. An RC composite component with a spark gap as set forth in claim 1, wherein said varnishes include a thermosetting resin.

11. An RC composite component with a spark gap as set forth in claim 10, wherein said thermosetting resin is a phenol resin.

12. An RC composite component with a spark gap as set forth in claim 10, wherein said thermosetting resin is a silicone resin.

13. An RC composite component with a spark gap as set forth in claim 10, wherein said thermosetting resin is an epoxy resin.

14. An RC composite component with a spark gap as set forth in claim 1, said varnishes include a thermoplastic resin.

15. An RC composite component with a spark gap as set forth in claim 14, wherein said thermoplastic resin is polyvinyl chloride.

16. An RC composite component with a spark gap as set forth in claim 14, wherein said thermoplastic resin is polyethylene.

17. An RC composite component with a spark gap as set forth in claim 1, wherein said capacitor comprises at least a pair of opposed capacitor electrodes which form an electrostatic capacity therebetween, said capacitor electrodes being respectively formed on the opposite surfaces of said dielectric substrate.

18. An RC composite component with a spark gap as set forth in claim 17, wherein said capacitor forms two series-connected electrostatic capacities, said capacitor electrodes include first and second electrodes separately formed on one surface of said dielectric substrate and a third electrode formed on the other surface of said dielectric substrate so that it is opposed commonly to said first and second electrodes.

19. An RC composite component with a spark gap as set forth in claim 18, wherein said pair of electrodes are formed such that they integrally extend respectively from said first and second electrodes, and wherein one integral electrode composed of said first electrode and one discharge electrode and the other electrode composed of said second electrode and the other discharge electrode have portions closest to each other defined by their respective discharge electrode portions.

20. An RC composite component with a spark gap as set forth in claim 19, which further comprises a coating resin having insulating qualities and covering said dielectric substrate in such a manner as to leave at least said pair of discharge electrodes exposed.

21. An RC composite component with a spark gap as set forth in claim 19, which further comprises a pair of lead wires electrically connected respectively to said first and second electrodes and led out over a distance greater than the distance between said pair of discharge electrodes to constitute external terminals.

22. An RC composite component with a spark gap as set forth in claim 18, wherein said resistor is a film resistor formed on said dielectric substrate to extend between said first and second electrodes.

23. An RC composite component with a spark gap as set forth in claim 22, wherein said film resistor extends zigzag.

24. An RC composite component with a spark gap as set forth in claim 1, wherein said spark gap is 6 mm or less.

25. An RC composite component with a spark gap as set forth in claim 1, wherein said spark gap is 4 mm or less.

* * * * *